April 21, 1970 R. L. EILENBERGER 3,507,981

SINGLE VIDICON COLOR VIDEO TELEPHONE SYSTEM

Filed Dec. 19, 1966 3 Sheets-Sheet 1

INVENTOR
R. L. EILENBERGER
BY Daniel D. Dubosky
ATTORNEY

SINGLE VIDICON COLOR VIDEO TELEPHONE SYSTEM

Filed Dec. 19, 1966 3 Sheets-Sheet 2

United States Patent Office 3,507,981
Patented Apr. 21, 1970

3,507,981
SINGLE VIDICON COLOR VIDEO TELEPHONE SYSTEM

Robert L. Eilenberger, Colts Neck Township, Monmouth County, N.J., assignor to Bell Telephone Laboratories, Incorporated, Murray Hill and Berkeley Heights, N.J., a corporation of New York Filed Dec. 19, 1966, Ser. No. 602,974
Int. Cl. H04n 9/06
U.S. Cl. 178—5.2 7 Claims

ABSTRACT OF THE DISCLOSURE

A video telephone system is described in which each subscriber's subset has a single vidicon camera tube which is scanned by a simple linear sweep having a constant rate throughout each frame. The scene to be transmitted is optically coupled to the face of the vidicon so as to produce three charge patterns representing the green, red and blue information from the scene. The areas of the charge pattern representing the red and blue information are caused to be equal, whereas the area of the green charge pattern is exactly twice as large in each of its two dimensions as the charge pattern for each of the other two colors. As a result picture resolution in approximately the correct proportion for each of the primary colors is obtained. The video signal resulting from every other complete vertical scan is multiplexed with the video signal from a second subscriber's subset and transmitted to a remote location. In the remote location the video signals are separated and the color information in each video signal is processed by apparatus which produces three continuous simultaneous color signals.

Figure 1:
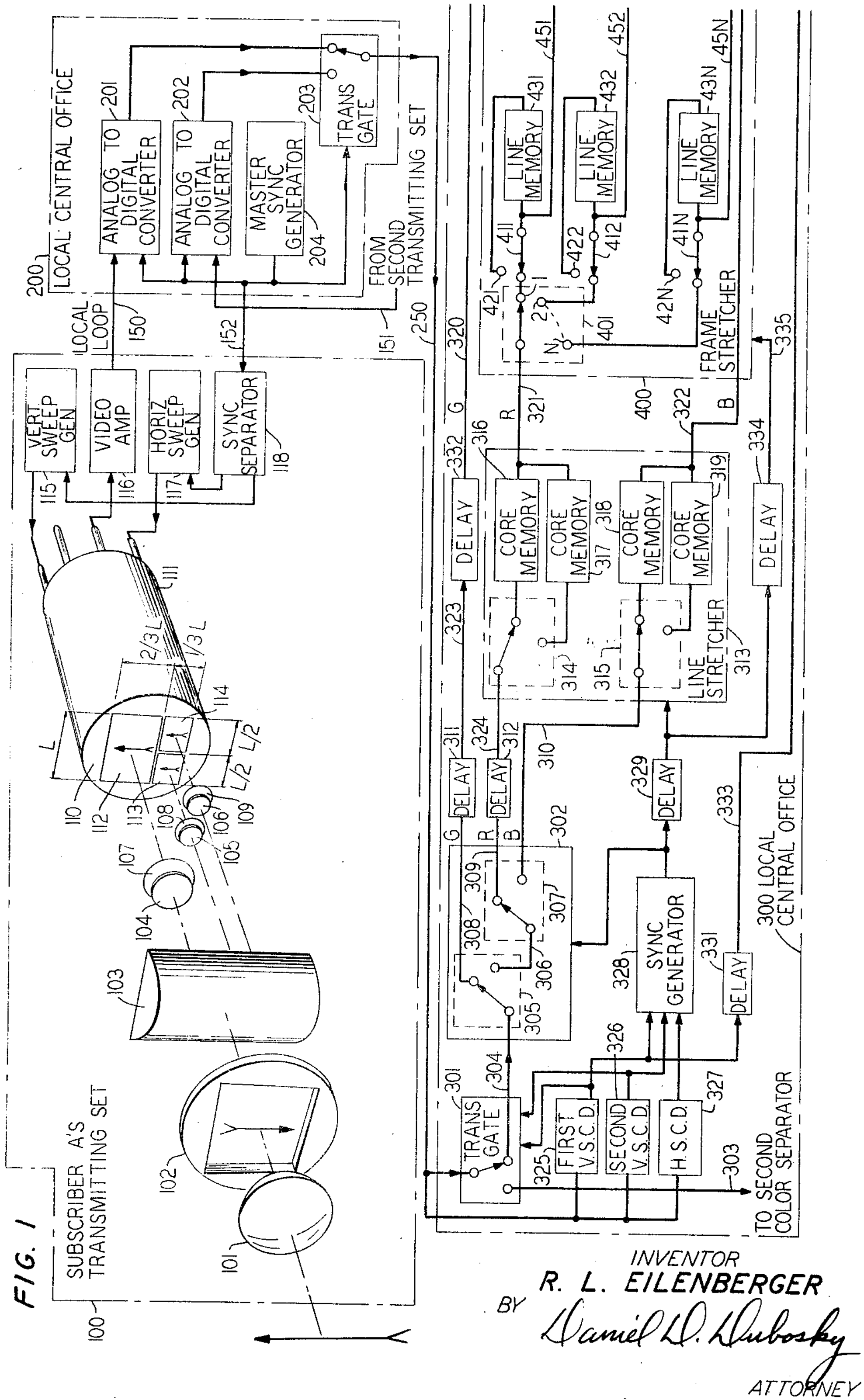

This invention relates to color video telephone systems, and more particularly to color video telephone systems which utilize a single vidicon in the subscriber's transmitting set.

Unlike commerical broadcast television wherein a single camera supplies a signal for many thousands of receivers, visual telephone systems require an equal number of transmitters and receivers, and therefore the subscriber's transmitting set becomes as important as the receiver as a place in the system to reduce the cost of the service to the consumer. Since many subscribers may be served from a single central office, it is economically advantageous to increase the complexity of the central office equipment if in so doing the subscriber's set will become proportionately simpler and therefore less expensive.

One item which is particularly expensive in the transmitting set is the vidicon. If it is desired to provide the subscribers with color images, it is not likely that video telephone systems will be able to afford the luxury of utilizing three vidicons, one for each of the primary colors, as is done in commercial television. Instead, it is much more likely that a single vidicon will be used with three images focused on its light sensitive target, each image containing information from a different one of the three primary colors in the scene to be transmitted.

In order to maintain as high a degree of resolution as possible, the maximum amount of area which is available on the vidicon target should be utilized by the three color images. For the standard vidicon having a circular target, the type of rectangle which utilizes the largest amount of this circular area is one having all sides of equal length, i.e., a square. In dividing this square into the three areas to be occupied by the three color images, a fact which should be taken into consideration is that the eye is not capable of resolving the so-called "red" and "blue" colors as well as the "green" image.

The economy of using a single vidicon rather than three vidicons for producing a color television signal would be somewhat wasted if special scanning techniques were necessary to remove the video signal information from the vidicon target. It is accordingly highly desirable from an economic standpoint for the subscriber's transmitting set to utilize the standard and straightforward method of linearly scanning from top to bottom and left to right during each destructive readout from the vidicon target. For any placement of three images on a vidicon target, simple linear scanning will, of course, mean that the signal output from the vidicon will be in some sense, time sequential with respect to the colors represented by the output signal. In order to transform this signal having a time sequential presentation of color information into three simultaneous signals, each representing a different one of the three primary colors, the system must at some point include means for separating the signal on a time basis into three separate channels and means in each channel for storing and repeating information in order to fill up the time gaps in each channel during intervals when the color corresponding to that channel is not present in the signal.

It is accordingly a primary object of the present invention to utilize only a single vidicon with simple linear scanning to obtain the information for three primary colors from a scene to be transmitted over a video telephone system.

Another object of the present invention is to arrange the images representing the three primary colors on the vidicon in an array which first, makes maximum use of the vidicon light sensitive target; second, provides an area for each image in accordance with the eye's ability to resolve the color represented by the image; and third, provides a color time sequential signal after simple linear scanning which can be efficiently utilized in the transformation to three simultaneous color signals.

These and other objects are attained in accordance with the present invention wherein the scene to be transmitted is optically coupled to the target of the vidicon so as to produce three image charge patterns respectively representing the green, red and blue information from the scene in a square array on the vidicon target. The area of the charge pattern representing the green information is caused to occupy the entire width (L) of the square and two-thirds of its height (⅔L), whereas the charge patterns representing the red and the blue information are each caused to be ½L in width and ⅓L in height. Hence the area representing the green information is caused to be in each of its two dimensions, exactly twice as large as the corresponding dimensions in each of the other areas. As a result, picture resolution in approximately the correct proportion for each of the primary colors is obtained without the additional circuitry which would be necessary to alter the resolution electronically as for example, by changing the beam diameter or by changing the scanning pitch. In addition, simple linear scanning of the charge patterns produces a signal which can be advantageously multiplexed with a signal from a second transmitting set in order to more efficiently utilize the long distance transmission medium.

Figure 2:
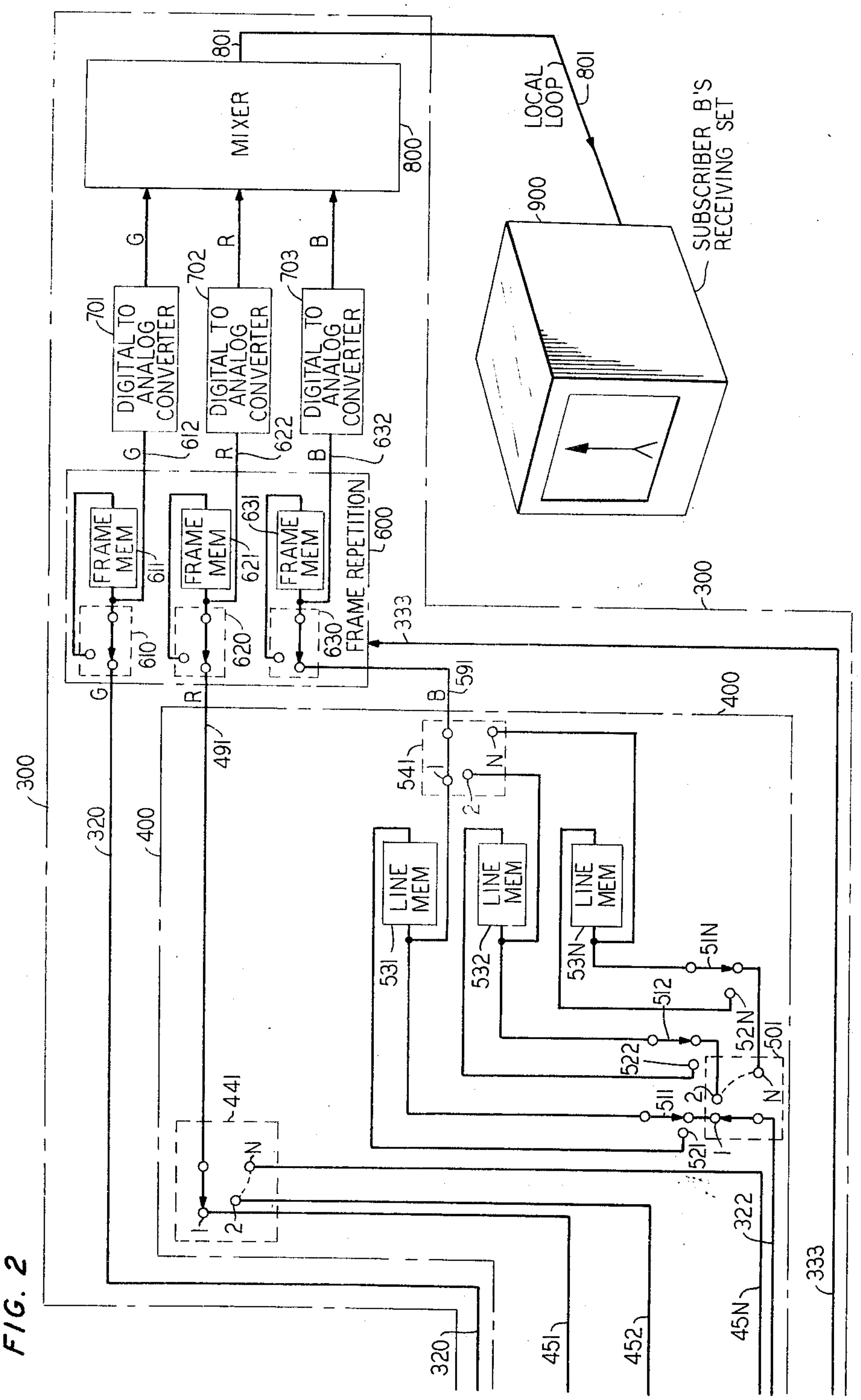
Figure 3:
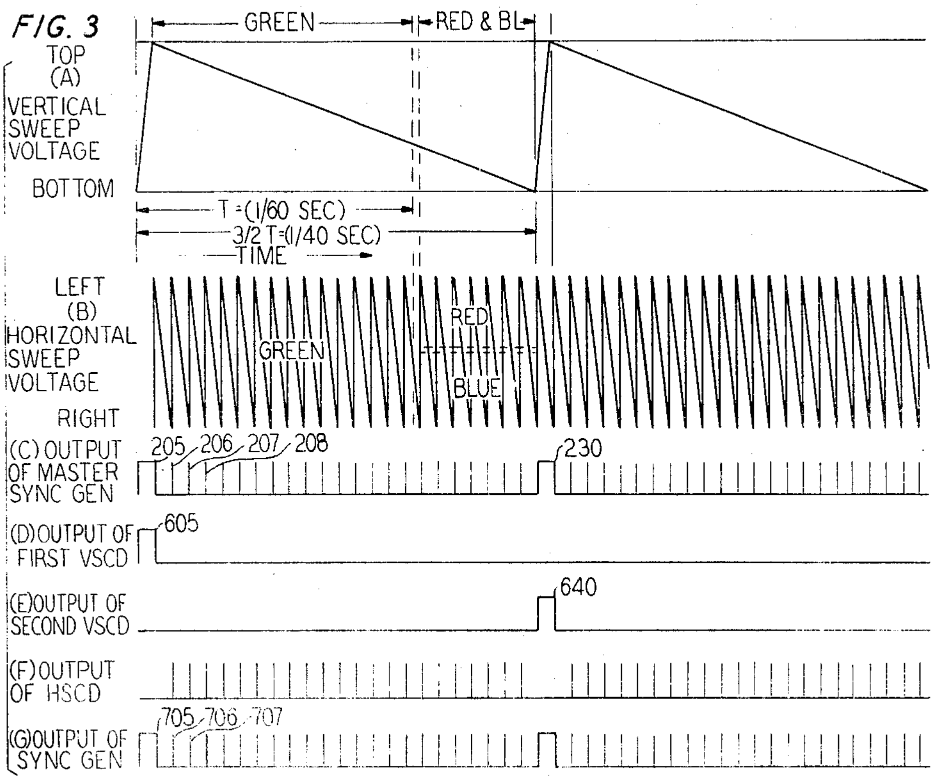
Figure 4:
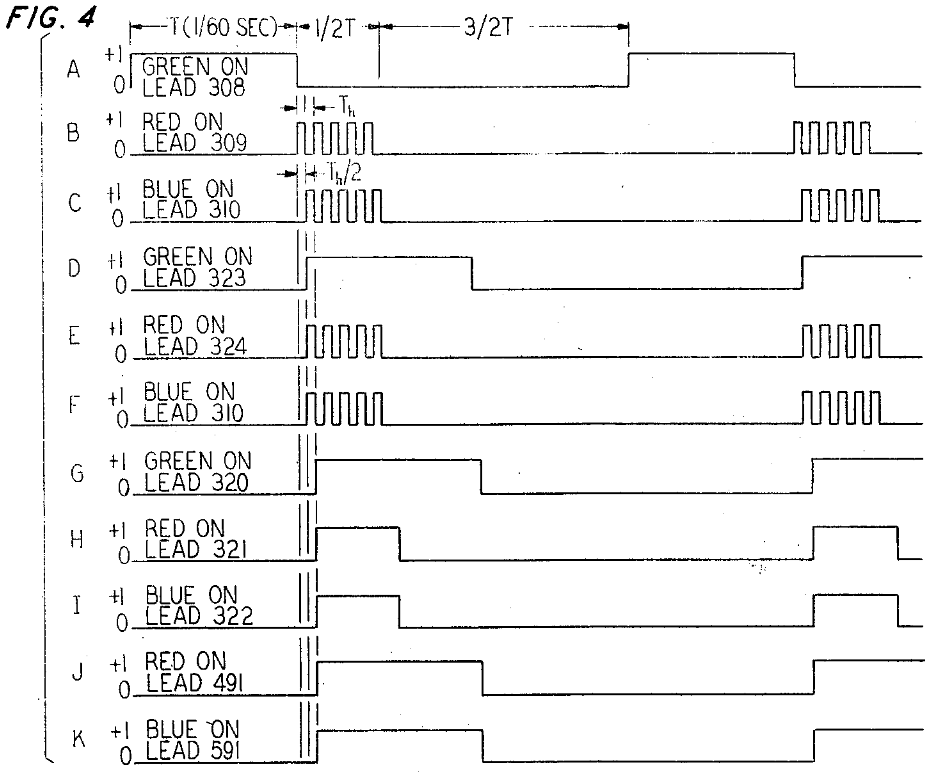

The above and other features of the invention will be more clearly understood following a consideration of the following detailed description taken in conjunction with the drawings wherein:

FIGS. 1 and 2, when joined by connecting the identically designated leads (with FIG. 1 to the left of FIG. 2) form a block schematic diagram of a system constructed in accordance with the present invention; and FIGS. 3 and 4 are presentations of voltage wave-forms useful in the explanation of the operation of the system shown in FIGS. 1 and 2.

Although the invention is intended for use in a video telephone system, only those portions of the system which are essential to an understanding of the invention are shown in the drawings. Accordingly, the portion of such a system which is used to transmit speech is not shown at all.

In FIG. 1, Subscriber A's Transmitting Set 100 includes a convex lens 101 which focuses a real image of the scene to be transmitted in the plane of a mask 102. In the drawings an upright arrow is shown for illustrative purposes as the scene to be transmitted. Mask 102 blocks the transmission of all light to the remainder of the optical system to be hereinafter described except for the portion of the real image which appears in its square aperture. As a result, only images having well defined boundaries are produced by the optical devices following mask 102.

An anamorphic lens system 103 shown in symbolic form in FIG. 1 as a simple cylindrical lens magnifies the image passed by the square aperture in mask 102 by a factor of $\frac{3}{2}$ in the horizontal direction only. As is well known in the art, no magnification takes place in the vertical direction by the action of anamorphic lens 103, i.e., in the direction parallel to the symmetrical axis of the imaginary cylinder of which the lens is a segment. A convex lens 104 gathers light passed by anamorphic lens 103 and focuses a real image 112 on the light sensitive target 110 of a vidicon 111. Convex lenses 105 and 106 similarly gather light from anamorphic lens 103 and focus real images 113 and 114 respectively on light sensitive target 110. Lenses 105 and 106 are of the same diameter, with the same focal length, and are placed in the same plane parallel to the light sensitive target 110, whereas lens 104 is larger in diameter, has a greater focal length than either of the lenses 105 or 106, and therefore must be placed at a greater distance from vidicon 111 in order to focus a larger real image on the same plane (target 110) as the real images produced by lenses 105 and 106. The distances and focal lengths are chosen so as to produce the square array of images shown in FIG. 1 on target 110.

As indicated by the dimensions shown for the images in FIG. 1, the magnification achieved by lens 104 is twice as great as that achieved by either of the lenses 105 or 106. Accordingly, for a square array of images having an arbitrary height and width of L, image 112 is $\frac{2}{3}$L in height whereas images 113 and 114 are each $\frac{1}{3}$L in height; taking the $\frac{3}{2}$ magnification of anamorphic lens 103 into account, image 112 is L in width and images 113 and 114 are each $\frac{1}{2}$L in width. These dimensions are approximate since it is advantageous, for purposes of isolation, to maintain a small amount of separation as shown in FIG. 1 between the images on target 110.

All of the light from lens 104 is caused to pass through filter 107 which is chosen to have a color transmittance such that the only light passed by filter 107 is in the "green" portion of the light frequency spectrum. Similarly all of the light from lenses 105 and 106 is caused to pass through filters 108 and 109 respectively which are so chosen that the only light passed by them are in the "red" and "blue" portions of the frequency spectrum. Accordingly, images 112, 113 and 114 and the charge patterns produced thereby contains the information which is necessary to reconstruct a color image of the original scene as is done by all of the present commercial television receivers utilizing the three color method of reconstruction.

As pointed out hereinabove, simple linear scanning of target 110 is desirable in order to keep the required deflection circuitry in the transmitting set as simple and therefore inexpensive as possible. Simple vertical and horizontal deflection voltages of the type which are required if the vidicon has electrostatic deflection are shown in the waveform plots A and B of FIG. 3. These voltages are generated by vertical sweep generator 115 and horizontal sweep generator 117 and applied to the vertical and horizontal deflection plates respectively of vidicon 111.

The instants of vertical and horizontal flyback are determined by the pulses supplied by a master sync generator 204 in the central office 200. These synchronizing pulses from master generator 204 are shown in waveform C of FIG. 3 and are coupled over local loop 152 to the sync separator 118 of the Subscriber A's Transmitting Set 100. Sync separator 118 separates the vertical sync pulses (shown as 205 and 230 in waveform C of FIG. 3) from the horizontal sync pulses (shown as pulses 206, 207, 208, etc. in waveform C of FIG. 3) and supplies them as synchronization pulses to vertical sweep generator 115 and horizontal sweep generator 117 respectively.

As indicated in waveform A and B of FIG. 3 showing the vertical and horizontal sweep voltages respectively versus time, the charge pattern developed on target 110 by image 112 representing the green information from the scene, is scanned in an interval of T seconds, where $\frac{3}{2}$T is equal to the period of the vertical sweep voltage. For reasons which will be better understood after the entire system has been described, the value for T is selected to be equal to the period of the frame rate of presentation in the receiving set. The receiver's frame rate in the present circuit is chosen to be 60 frames per second without any interlace. Any substantially lower rate is found to produce an annoying flicker effect. Hence, a typical value for T is $\frac{1}{60}$ seconds and for $\frac{3}{2}$T is $\frac{1}{40}$ seconds as indicated in FIG. 3.

After the $\frac{1}{60}$ second during which the electron beam of vidicon 111 has scanned the green charge pattern only, the electron beam of vidicon 111 is caused to scan and read out the charge patterns produced on target 110 by red image 113 and green image 114. As indicated in waveforms A and B of FIG. 3, scanning of the entire square array of charge patterns is carried out in the standard fashion from top to bottom and left to right without regard for the fact that the charge patterns are separate and distinct and represent different information from the original scene. As a result of the separation which is maintained between the images 112, 113 and 114, the video signal at the output of vidicon 111 will contain a relatively long black-direction level during each cycle of the vertical sweep when the beam of vidicon 111 is passing from the charge pattern produced by green image 112 into the charge patterns produced by images 113 and 114. Relatively shorter repetitive black-direction levels will also be present in the video signal during the instants when the beam of vidicon 111 is passing from the red image 113 into the blue image 114.

The video signal from vidicon 111 in FIG. 1 is amplified by a video amplifier 116 and coupled via a local loop 150 to a local central office 200. In the central office 200, the incoming video signal from Subscriber A's Transmitting Set 100 is encoded by an analog to digital converter 201 into a digital form of signal. The number of samples per horizontal line and number of bits per sample are chosen so as to provide the desired amount of horizontal resolution. The relative resolution between colors will be unaltered by the encoding by converter 201 since the video signal from each line of the green image 112 will automatically be sampled twice as many times as the video signal corresponding to one-half line of either the red or blue images 113 and 114. A second video signal from a second transmitting set (not shown in FIG. 1) is received on line 151 and similarly encoded by analog to digital converter 202.

The analog to digital converters 201 and 202 are also connected to receive the vertical and horizontal synchronization pulses from the master sync generator 204. The analog to digital converters are programmed to cease encoding the video signal at their inputs during the occurrence of each sync pulse, that is during the flyback intervals, and instead to produce, at each of their outputs, a digital code word which indicates the occurrence of a synchronization pulse. The same digital code word is produced by each of the converters 201 and 202 during the occurrence of a horizontal sync pulse whereas each of the converters produces its own unique digital code word during the occurrence of a vertical sync pulse. As a result, the origin of either of the digital video signals can be identified at any later point in the system by simply looking at the unique digital code word during the instant of the vertical sync pulse. This production of digital code words during the occurrence of synchronization pulses in no way interferes with the encoding of useful video information since these pulses occur during the flyback.

Unlike commercial broadcast television, video telephone systems are not likely to be called upon to transmit activities having fast motions such as sporting events. The picture to be transmitted will most usually be the face of the person speaking against the rather stationary background of the room in which he is sitting. Accordingly, a rate of 30 complete pictures per second as in commercial television (60 fields per second with a two-to-one interlace of fields) is believed to be more than necessary. Tests have shown that 20 new complete pictures per second should be adequate in a video television system. The instant invention does not use interlaced fields. Each scan of vidicon 111 from a top to bottom constitutes one frame of picture information. Consequently, although it is necessary to display 60 pictures per second in the receiving set in order to eliminate the annoying flicker effect, it is only necessary that the picture be changed after three identical frames. New information need be sent from the transmitting local office to the receiving local office only every $\frac{1}{20}$ second.

According to the instant invention, the digitally encoded signal from converter 201 is coupled to one input of transmission gate 203, the other input of which is connected to receive a second video signal encoded by a converter 202. Although shown symbolically as a single pole double throw switch, transmission gate 203 and other similar gates to follow are actually electronic switches of the type described in Chapter 14 of the text, "Pulse and Digital Circuits," by Millman and Taub, McGraw-Hill Book Company, Inc., copyright 1956. Gate 203 operates at a 20 cycle per second rate alternately connecting the digital signals from converter 201 and those from converter 202 to transmission medium 250, each for a period of $\frac{1}{40}$ second. The operation of gate 203 is synchronized by the vertical sync pulses from master generator 204 with the incoming signals on local loops 150 and 151, with elastic delay lines if necessary, such that the digital signals at its input are connected to transmission medium 250 for intervals of $\frac{1}{40}$ second which correspond to single complete vertical sweeps of the electron beam in vidicon 111 from top to bottom of target 110. Hence the digital signal on transmission medium 250 sequentially represents the green information from subscriber's set 100, the red and the blue information from set 100, the green information from loop 151, the red and the blue information from loop 151, the green information from set 100, etc.

Transmission medium 250 is connected at its receiving end to a local central office 300 associated with a Subscriber B's Receiving Set 900 to which Subscriber A desires that his pictures be sent. In the local central office 300, the digital signal on transmission medium 250 is connected to the inputs of transmission gate 301, a first vertical sync code detector 325, a second vertical sync code detector 326, and a horizontal sync code detector 327. The first vertical sync code detector 325 is programmed to recognize the unique digital code word developed by analog to digital converter 201 during a vertical synchronization pulse from generator 204; in response to receiving this word at its input detector 325 produces an output pulse 605 shown in waveform D of FIG. 3 thereby indicating that the digital signal which follows this output pulse for the next $\frac{1}{40}$ second represents video signal which was encoded by analog to digital converter 201. The second vertical sync code detector 326 is programmed to recognize the unique digital code word developed by analog to digital converter 202 during a vertical synchronization pulse from generator 204; in response to receiving this word at its input, detector 326 produces an output pulse 640 shown in waveform E of FIG. 3 thereby indicating that the digital signal which follows this output pulse for the next $\frac{1}{40}$ second represents video signal which was encoded by analog to digital converter 202. The output pulses 605 and 640 are connected to transmission gate 301 in order to synchronize the latter in its operation at a 20 cycle per second rate of connecting the digital signals on transmission medium 250 through to lead 304 for $\frac{1}{40}$ second following output pulse 605 and to lead 303 for $\frac{1}{40}$ second following output pulse 640. Hence gate 301 performs the inverse of the operation performed by gate 203 in that gate 301 separates the two signals which were combined for transmission over transmission medium 250 by connecting the portion of the digital signal corresponding to the information from transmitting set 100 through to color separator 302 and by connecting the remaining portions of the digital signal to a second color separator (not shown in FIG. 1) via lead 303. As a result, the signal on lead 304 contains a $\frac{1}{40}$ second interval of digital information and a $\frac{1}{40}$ second blank interval during each $\frac{1}{20}$ second interval.

The horizontal sync code detector 327 is programmed to recognize the digital code word developed by converters 201 and 202 during the horizontal synchronrzation pulses from generator 204, and in response to each receipt of this word at its input, detector 327 produces an output pulse, thereby developing the pulse train shown in waveform F of FIG. 3. The output pulses from the first and second vertical sync code detectors 325 and 326 and from the horizontal sync code detector 327 are all connected to sync generator 328 for the purpose of synchronizing the latter in its production of a train of vertical and horizontal synchronization pulses (shown in waveform G of FIG. 3) in synchronism with the sync code words in the digital signal on lead 304. This train of synchronization pulses from generator 328 is utilized in the local central office 300 for the purpose of synchronizing the operation of the many transmission gates to be described hereinafter, with instants of specific occurrences in the digital signal.

The first vertical, second vertical, and horizontal sync code detectors 325, 326, and 327 may be made up of any number of circuits well known to those skilled in the art. For example, a code-operated multiposition switch of the type shown in section 13–15 of page 422 of the textbook "Pulse and Digital Circuits" by Millman and Taub, McGraw-Hill Book Company, Inc. (1956) can have its binary switches set by the incoming digital signal on transmission medium 250 through a register of the type shown in sections 13–10 of the above-identified textbook. Each of three leads in the code-operated switch can be programmed to produce an output voltage when the proper digital code word is received on transmission medium 250.

Color separator 302 contains two transmission gates 305 and 307, which connect the digital signal on lead 304 through to one of the output leads 308, 309 and 310, in a time sequential operation such that only the portion of the digital signal which represents the green information will appear on lead 308, only the portion representing the red on lead 309, and only the portion representing the blue on lead 310. Gate 305, synchronized by the vertical synchronization pulses from generator 328, connects the signal on lead 304 through to lead 308 for an interval of $\frac{1}{60}$ second beginning with the instant of vertical fly-back and ending with the black-direction level which exists at the end of the digital signal representing the green. Gate 305 connects the signal on lead 304 through to lead 306 for the remainder of a $\frac{1}{40}$ second interval, i.e., for $\frac{1}{120}$ second, thereby connecting the signal representing the sequential red and blue line scans to the input of gate 307. Gate 307, synchronized by the horizontal synchronization pulses from generator 328, operates at a rate equal to the horizontal sweep frequency ($f_h$) connecting the signal on lead 306 through to lead 309 for an interval beginning with flyback of the horizontal sweep and ending with the black-direction level which exists between the red and blue information. Gate 307 connects the signal on lead 306 through to lead 310 for the remainder of the total interval equal to one horizontal line time ($T_h=1/f_h$), that is, during the interval from the red to blue black-direction level to the horizontal fly-back time.

The digital signals present on leads 308, 309 and 310 are graphically represented in waveforms A, B and C of FIG. 4 respectively, A +1 indication in the waveforms of FIG. 4 indicates the presence of a digital signal whereas a 0 indication indicates the absence of digiital signal. No attempt has been made in FIG. 4 to indicate the individual bits of the digital signal. In addition, in actual practice, $T_h \ll T$ and, therefore, the digital signals representing the red and blue information are present and absent for a much greater number of times than has been illustrated in FIG. 4. In the interests of clarity, however, the waveforms representing the presence and absence of red and blue digital signals have been drawn as though only five horizontal lines were utilized to scan the red image 113 and blue image 114.

Lead 308 is connected to delay network 311 which delays the digital signal representing the green for an interval of ($T+\frac{1}{2}T_h$) seconds. Lead 309 is connected to delay network 312 which delays the digital signal representing the red for an interval of $\frac{1}{2}T_h$ seconds. Consequently, the digital word on lead 323 representing the beginning of the first scan line of the green image, the digital word on lead 325 representing the beginning of the first scan line of the red image, and the digital word on lead 310 representing the beginning of the first scan line of the blue image occur simultaneously. Voltage waveforms representing the digital signals on leads 323, 324, and 310 are shown in waveforms D, E, and F of FIG. 4 respectively.

In order to obtain digital signals for the red and blue which are continuous and of substantially the same length in time as the digital signal for the green, local central office 300 contains two groups of apparatus which operate only on the red and blue digital signals and are designated in FIGS. 1 and 2 of the drawings as line stretcher 313 and frame stretcher 400. Leads 324 and 310 couple the red and blue digital signals respectively to identical apparatus within line stretcher 313 which spreads out each segment of red and blue digital signal representing a single horizontal scan of each of the red and blue images to a full line scan interval of $T_h$ seconds. The method utilized in line stretcher 313 to spread out each of the red and blue digital signal is to load the words in each digital signal segment representing a single scan line into a core memory. These digital words are then read out at one-half of the rate at which they were written into the memory. The transmission gates 314 and 315 in line stretcher 313 which are used to steer the line segments of digital signal into core memories 316–319 are synchronized in their operation by the vertical and horizontal sync pulses derived from sync generator 328 through delay network 329. The latter network has a delay of ($T+\frac{1}{2}T_h$) seconds. Hence, the digital words representing the beginning of the first horizontal scan lines of the green, red, and blue images on leads 323, 324, and 310 occur at the termination of vertical sync pulse 705 in waveform G of FIG. 3 and succeeding segments of video representing succeeding scanning lines of the images begin at the termination of each succeeding horizontal sync pulse.

More particularly, the digital signal on lead 324 representing the first horizontal scan line of red image 113 is coupled through transmission gate 314 to core memory 316. Core memory 316 has a sufficient capacity to store the words produced by analog to digital converter 201 during one horizontal sweep of the red image 113, i.e. during $\frac{1}{2}T_h$ seconds. After an interval of $\frac{1}{2}T_h$ seconds the digital signal representing the first scan line of the red image at the output of delay network 312 has ended as indicated in waveform E of FIG. 4, and core memory 316 is fully loaded. Transmission gate 314 is then activated so as to couple lead 324 to the input of core memory 317 in preparation to receiving the signal representing the second scan line of the red image, at the same instant the readout of words from core memory 316 is begun at one-half of the rate at which the words were written into the memory. When core memory 316 is one-half empty, the signal representing the second line begins loading core memory 317. When core memory 317 is fully loaded, the readout of core memory 316 has ended, gate 314 then connects to the input of core memory 316 in preparation for receiving the signal representing the third scan line of the red image, and the readout of memory 317 is begun. This process continues throughout the entire red signal with the signal representing the odd lines of the red image being written into and read out of core memory 316, and the signal representing the even scan lines being written into and read out of core memory 317. As a result of reading out the stored words at one-half of the rate of write-in, the digital signal on lead 321 which represents one scan line of the red information from image 113 lasts for the full interval of one horizontal scanning line, i.e., for $T_h$ seconds and the spaces which existed in the digital signal on lead 324 are eliminated, as indicated in the voltage waveform H of FIG. 4.

The digital signal representing first scan line of the blue image on lead 310 is coupled by transmission gate 315 through to core memory 318 at the instant when the digital signal representing the first scan line of the red image is being coupled through to memory 316. Gate 315, memory 318, and memory 319 operate on the digital signal on lead 310 representing the blue information in identically the same way as gate 314, memory 316 and memory 317 operate on the digital signal representing the red information. Accordingly, the digital signal on lead 322 at the output of line stretcher 313 representing each horizontal line of the blue image 114 also lasts for an interval of $T_h$ seconds, as indicated in the voltage waveform I of FIG. 4.

Delay network 332 delays the digital signal on lead 323 representing the green information by $T_{h/2}$ seconds, an interval equal to that which is required for the loading of each of the core memories in line stretcher 313. As a result, the digital signal on lead 320 representing the green information begins the first scan line of the green image at the same instant as the beginning of digital signals representing the first scan lines of the red and blue images on leads 321 and 322 respectively. As indicated in waveforms G. H and I of FIG. 4 representing the digital signals on leads 320, 321 and 322, respectively, the red and blue digital signals on leads 321 and 322 do not last for the full length of the time interval of $\frac{1}{60}$ second occupied by the green digital signal on lead 320 since the red and the blue images 113 and 114 are scanned in vidicon 111 by one-half of the number of lines required for the scanning of green image 112. In order to produce red and blue digital signals having a time interval and a number of scanning lines equal to that of the green, the red and blue digital signals on leads 321 and 322 respectively, are connected to apparatus designated in the drawings as frame stretcher 400.

In frame stretcher 400, lead 321 is connected to the input of a transmission gate 401 shown symbolically in the drawings as a single pole multiposition switch. Gate 401 and all other transmission gates in frame stretcher 400 are synchronized with the occurrence of specific instants in the incoming digital signals by the train of vertical and horizontal sync pulses delivered to frame stretcher 400 through delay network 334 via lead 335. The latter network delays the sync pulses at the output of network 329 by an interval of $T_{h/2}$ seconds in order to account for the delay encountered by the digital signals in network 332 and line stretcher 313. Gate 401 is synchronized with the sync pulses on lead 335 such that the digital signal representing the first scan line of the red image is connected to terminal 1 of gate 401, the digital signal representing the second scan line is connected to terminal 2, etc. through to the digital signal representing the last line of the red image which is connected to terminal N of gate 401. A second transmission gate 411 connects terminal number 1 of gate 401 to a line memory 431 and the connection is maintained until the digital signal representing the first line of the red image has been written into line memory 431. At this instant, that is, when gate 401 switches to its terminal number 2, gate 411 connects the input of line memory 431 to terminal 421, and the digital signal in memory 431 is caused to circulate in the memory until the appearance of a vertical sync pulse on lead 335 at which time gate 411 is reconnected to terminal 1 of gate 401. Similarly, gate 412 remains connected to terminal 2 of gate 401 until the signal corresponding to the second line of the red image has been written into line memory 432. At this time, that is when gate 401 switches to its terminal number 3, gate 412 connects the input of line memory 432 to terminal 422, and the digital signal in memory 432 is caused to circulate in the memory until the appearance of a vertical sync pulse on lead 335 at which time gate 412 is reconnected to gate 401. The process of loading a separate memory with the digital signal representing each line of the red image and retaining that signal until the appearance of a vertical sync pulse on lead 335 continues for each and every line of the red image up to and including the digital signal representing the last line which is connected through terminal N of gate 401 into memory 43N. Acoustic delay lines having ceramic transducers at each end may be advantageously used as line memories 431 through 43N.

For a typical case wherein 160 scanning lines are used for scanning the green image 112, and 80 scanning lines for the red and blue images 113 and 114, a total number of 80 line memories are necessary in the positions designated as 431, 432 through 43N. Only the first, second and last have been shown, however, in order to simplify the drawings.

The input of each line memory 431, 432, etc. is also connected to an input terminal of transmission gate 441 bearing a number corresponding to the line stored in the respective memory. Gate 441 is caused to start at terminal 1 at the termination of a vertical sync pulse on lead 332 and sequentially step toward its last terminal N at a rate which is one-half as fast as the operation of gate 401. In other words, gate 441 remains connected to each terminal for an interval of $2T_h$ as compared with gate 401 which remains on each terminal for an interval of $T_h$. Accordingly, the digital signal representing the first line of the red image is coupled through gate 401, gate 411 and gate 441 to lead 491 during the first $T_h$ interval following a vertical sync pulse on lead 335. During the second $T_h$ interval when the digital signal representing the second line of the red image is being written into memory 432, the digital signal representing the first line is read out of memory 431 through gate 441 and appears as a second line of video signal on lead 491. During the third $T_h$ interval when the digital signal representing the third line of the red image is being written into memory 433 (not shown in the drawing), the digital signal representing the second line is read out of memory 432 through terminal 2 of gate 441 and appears as a third line of video signal on lead 491. During the fourth $T_h$ interval when the digital signal representing the fourth line is being written into a memory in frame stretcher 400, the signal for the second line is again read out of memory 432 through gate 441 to appear as a fourth line of video signal on lead 491. This process of reading out memories 431, 432 through 43N is continued until the digital signal representing each line of the red image has been doubly produced on lead 491. The second readout to lead 491 of the digital signal representing the last line of the red image occurs when the digital signal representing the last line of the green image is presented on lead 320.

Apparatus identical to that used for expanding the red signal to a frame time of T seconds is also contained in frame stretcher 400 for performing the same operation on the blue digital signal of lead 322. Apparatus in frame stretcher 400 bearing a numbered designation having a hundred's digit of 5 performs in identically the same way as apparatus in frame stretcher 400 having the same tens and units digits but a hundred's digit of 4. Consequently, digital signal representing each line of the blue image on lead 322 is doubly produced on lead 591 and the total frame time of the blue signal on lead 591 like that of the red signal on lead 491 is equal to T seconds, the frame time of the green signal. The red and blue digital signals on leads 491 and 591 are represented by the waveforms J and K respectively of FIG. 4.

Although the digital signals on leads 320, 491, and 591 are simultaneous and provide information for a full time interval (T) equal to that of the time required for one field in the receiving set, there are gaps in each of these digital signals equal to two $1/60$ second intervals between each $1/60$ second interval of signal as indicated in waveforms G, J, and K of FIG. 4. To fill in these gaps, the signals on leads 320, 491, and 591 are connected to frame repetition apparatus 600 in which identical circuits are provided to frame repeat each of the signals.

The output pulse from first vertical sync code detector 325, delayed for an interval of $(T+T_h)$ seconds by delay network 331, provides a synchronization pulse on lead 333 to frame repetition apparatus 600 which indicates the start of the digital signals on leads 320, 491, and 591. During the $1/60$ second interval following the pulse on lead 333, transmission gate 610 connects the signal on lead 320 through to the input of frame memory 611 and to lead 612. Frame memory 611 contains an acoustic delay line having a delay time equal to one frame time (T). At the end of the signal interval on lead 320, i.e., T seconds after the pulse appears on lead 333, gate 610 connects the input of frame memory 611 through to its output and the information is permitted to circulate until a second pulse appears on lead 333, that is, to circulate for an interval of two frame times (2T). During this latter interval a signal representing two additional frames identical to the digital signal representing the single frame stored in memory 611 is read out of the memory on to lead 612. In the same way as, and with the same timing as, gate 610 and memory 611, gates 620 and 630 and memories 621 and 631 operate on the red and blue digital signals on leads 491 and 591 respectively. As a result, three simultaneous and continuous digital signals representing the three primary colors from the scene transmitted by set 100 of FIG. 1 are presented on leads 612, 622 and 632 of FIG. 2.

Digital to analog converters 701, 702 and 703 having the digital signals from leads 612, 622, and 632 connected to their respective inputs, produce three simultaneous analog signals at their outputs representing the three primary colors. Converters 702 and 703 differ in their operation from that of converter 701 in that the digital words at their inputs are presented at only one-half of the rate at which digital words appear at the input of converter 701 because of the previously described operation of line stretcher 313.

Mixer 800 combines the three simultaneous signals from converters 701, 702, and 703 into a single signal for transmission over local loop 801 to Subscriber B's Receiving Set 900. The particular method of combining in mixer 800 is not important to the present invention; the conventional technique utilizing a video signal with a subcarrier which has been modulated by color difference signals may be utilized.

What has been described hereinbefore is a specific illustrative embodiment of the principles of the present invention. It is to be understood that numerous other arrangements of physical parts and different component parts may be devised by those skilled in the art without departing from the spirit and scope of the invention.

What is claimed is:

1. Apparatus in a video telephone system for transmitting color images of a scene to a remote receiving set, said apparatus comprising a camera tube having a light sensitive target, optical means for producing three charge patterns of predetermined areas in a rectangular array on said camera tube target, each of said charge patterns containing the information from said scene for a different one of three primary colors, the predetermined area corresponding to the primary color called "green" being larger in both dimensions than the other two areas and positioned so as to occupy the entire width of said rectangular array, means for developing a video signal by scanning said charge patterns across the width from top to bottom of said rectangular array, means for transmitting the video signal to a remote location, gating means at said remote location for separating the video signal into three separate channels, each channel containing information relating to only one of said three primary colors, means for repeating the information in each channel so as to form a substantially continuous signal in each of the three channels, and means for coupling the three continuous signals to the remote receiving set.

2. Apparatus as defined in claim 1 wherein the rectangular array of areas produced by said optical means has a height equal to its width, and the predetermined area corresponding to "green" occupies two-thirds of the height of said array, the remaining one-third height of said array being occupied by the two areas representing the other two primary colors.

3. Apparatus as defined in claim 2 wherein the means for developing a video signal includes a vertical sweep generator having a sawtooth voltage output with a frequency such that the "green" area is scanned in an interval equal to the time required for one presentation of a complete frame in said remote receiving set, and said gating means includes memory means for storing and repeating the video signal produced during each scan of said other two areas, thereby causing the video signal representing a single complete scan of each area to occupy equal intervals in each of said three separate channels.

4. Apparatus as defined in claim 3 wherein the means for transmitting the video signal to a remote location includes a transmission medium and a transmission gate which connects only the developed video signal from every other complete scan of the charge patterns to said transmission medium, said transmission medium being utilized to transmit other information during the time when said signal is not connected to said medium.

5. Apparatus in a video telephone system for providing three simultaneous color signals to a remote receiving set having picture presentation of $(1/T)$ fields per second, said apparatus comprising a camera tube having a light sensitive target, optical means for producing three charge patterns of predetermined two-dimensional areas in a square array on said camera tube target, each of said charge patterns containing the information from said scene for a different one of three primary colors, the predetermined area corresponding to the primary color called "green" positioned by said optical means so as to occupy the entire width and two-thirds of the height of said square array and the predetermined areas corresponding to the two primary colors other than "green" positioned by said optical means so as to each occupy one-half of the width of the one-third height of the square array not utilized by the "green" area, means for developing a video signal by scanning the charge patterns across the width from top to bottom of said square array, the scanning rate from top to bottom being chosen such that the area corresponding to the "green" is scanned in T seconds, means for transmitting the video signal from every other complete scan of the charge patterns to a remote location, gating means at said remote location for separating the received video signal into three separate channels, each channel containing information relating to only one of said three primary colors, means for repeating the signal in each channel whereby three substantially continuous signals are created, and means for coupling the three continuous signals to said receiving set.

6. Apparatus as defined in claim 5 wherein said optical means includes a mask having a square aperture, a lens for producing a real image of said scene in the plane of the aperture of said mask, and an anamorphic lens for magnifying the real image in one dimension only by a factor of three-halves.

7. Apparatus in a transmitting set of a video telephone system for the transmission of color images of a scene, said apparatus comprising a camera tube having a light sensitive target, optical means for producing three charge patterns of predetermined areas in a rectangular array on said camera tube target, each of said charge patterns containing the information from said scene for a different one of three primary colors, the predetermined area corresponding to the primary color called "green" being larger in both dimensions than the other two of said three areas and positioned so as to occupy the entire width of said rectangular array, and means for developing a video signal by scanning said charge patterns across the width from top to bottom of said rectangular array; said rectangular array having a height equal to its width with the predetermined area corresponding to "green" occupying two-thirds of the height of said array, the remaining one-third of the height of said array being equally divided in width between the other two of said three areas; said optical means including a mask having a square aperture, a lens for producing a real image of said scene in the plane of said aperture, and an anamorphic lens for magnifying the real image in one dimension only by a factor of three-halves.

References Cited

UNITED STATES PATENTS

| | | | |
|---|---|---|---|
| 2,389,646 | 11/1945 | Sleeper | 178—5.2 |
| 2,797,257 | 6/1957 | Law | 178—5.4 |
| 2,983,784 | 5/1961 | Razdow | 178—5.4 |
| 3,296,367 | 1/1967 | Cassagne | 178—5.4 |

FOREIGN PATENTS 1,041,590 9/1966 Great Britain.

ROBERT L. GRIFFIN, Primary Examiner

J. C. MARTIN, Assistant Examiner

U.S. Cl. X.R.

178—5.4